United States Patent

[11] 3,581,204

| [72] | Inventor | Fred D. Martin<br>Angleton, Tex. |
|---|---|---|
| [21] | Appl. No. | 815,865 |
| [22] | Filed | Apr. 14, 1969 |
| [45] | Patented | May 25, 1971 |
| [73] | Assignee | The Dow Chemical Company<br>Midland, Mich. |

[54] ELECTROMECHANICAL RECORDER AUTOMATIC ZERO APPARATUS
5 Claims, 1 Drawing Fig.

[52] U.S. Cl................................................. 324/130, 324/113
[51] Int. Cl............................................... G01r 1/02, G01r 13/04
[50] Field of Search........................................... 324/100, 99, 113, 130, 74; 330/9; 346/31

[56] References Cited
UNITED STATES PATENTS

| 3,047,797 | 7/1962 | Borsboom | 330/9X |
| 3,105,230 | 9/1963 | MacIntyre | 330/9X |
| 3,152,301 | 10/1964 | Burk | 330/9X |
| 3,454,878 | 7/1969 | Hendrix, Jr., et al. | 324/130X |
| 3,460,035 | 8/1969 | Louvel | 324/130X |

Primary Examiner—Rudolph V. Rolinec
Assistant Examiner—Ernest F. Karlsen
Attorneys—Griswold and Burdick and Earl D. Ayers ABSTRACT: This invention relates to means for providing an automatic zero to correct periodically for instrument drift to precisely the same point each time after such drift occurred. The automatic zero means of this invention senses the position of a recorder pen and corrects the incoming signal to move the pen to a definite position. Variations that may be encountered in an electronic zero or signal condition feeding the recorder are zeroed out with the signal drift in order to position the recorder pen at a specified point.

PATENTED MAY 25 1971 3,581,204
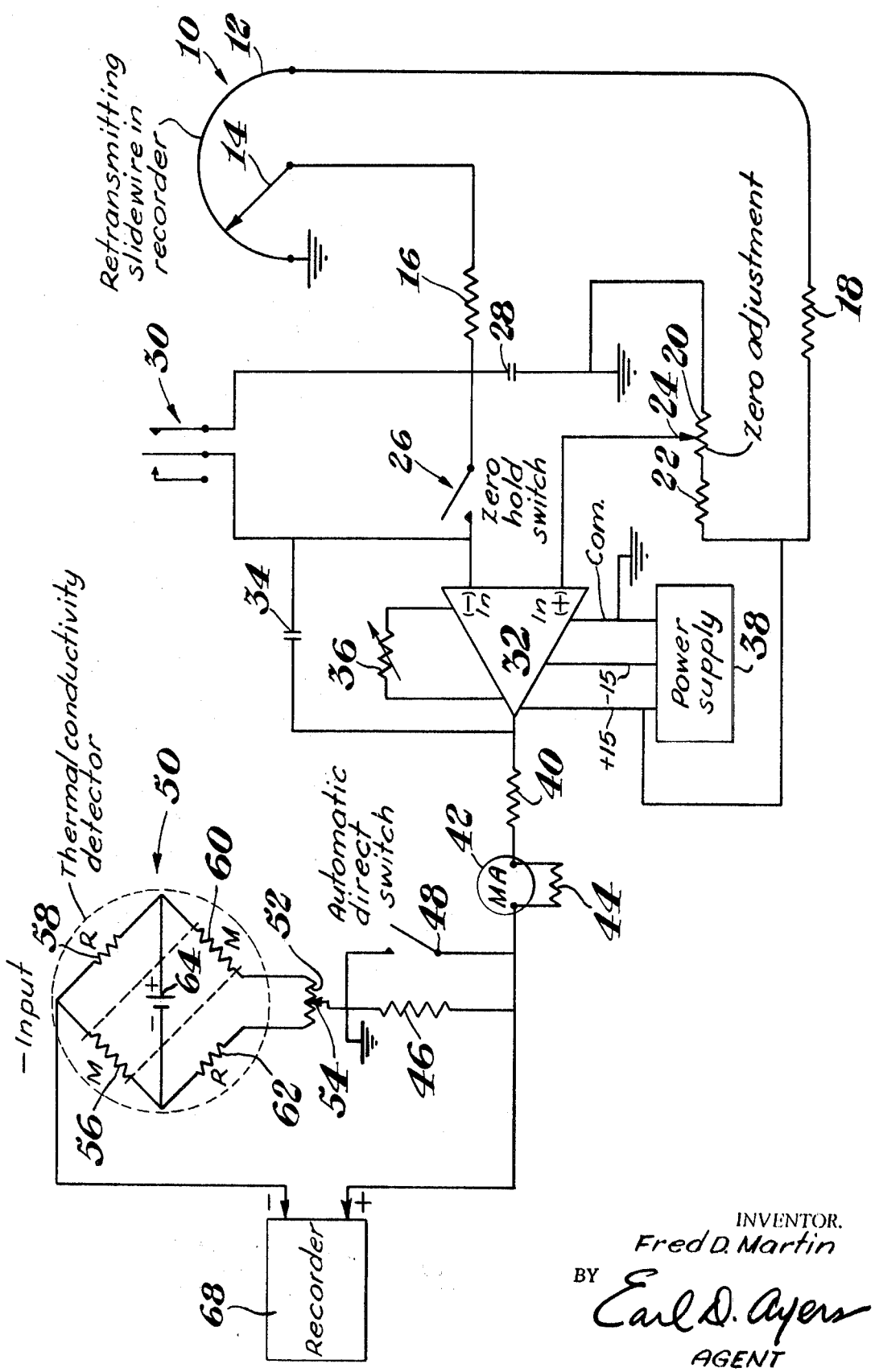
INVENTOR.
Fred D. Martin
BY Earl D. Ayers
AGENT

ELECTROMECHANICAL RECORDER AUTOMATIC ZERO APPARATUS

BACKGROUND OF THE INVENTION

This invention relates to means to correct periodically for instrument drift and particularly to means for providing an automatic zero to correct periodically for instrument drift to the same point each time after such drift occurred.

Other known methods of correcting instrument drift are subject to variations caused by changes in ambient temperature, electromagnetic radiation pickup, or other variables that caused the place at which the unit zeros to change with time. The automatic zero described herein senses the position of the recorder pen and corrects the incoming signal to move the pen to a definite position. Variations that may be encountered in an electronic zero or signal condition feeding the recorder are zeroed out with the signal drift in order to position the recorder pen at a specified point.

There are several different zeroing techniques in use at present. Two commonly used involve an electromechanical system and an electronic system. The electromechanical system injects a signal or changes the balance on a bridge circuit with a potentiometer using a servo amplifier and motor. The servo amplifier senses the zero error signal and amplifies it. This amplified signal drives a servo motor to position the potentiometer to a point where its output compensates for the zero error signal. The servo motor is turned off so that the potentiometer will continue to compensate for the zero offset as the desired signal is monitored by the recorder.

The electronic system applies current of the proper polarity and magnitude to a resistor that may be in the bridge circuit or in series with the signal leads so that the voltage drop will compensate for the zero offset. The polarity and magnitude of the zero correction voltage is determined by an amplifier that senses the direct current signal on the recorder input or similar location. A hold amplifier retains the proper current through this resistor when not zeroing and allows the desired signal to be monitored by the recorder.

Such systems may be and often are subject to variations caused by changes in ambient temperature, electromagnetic pickup, or other variables that cause the place at which the unit zeros to change with time.

Accordingly, a principal object of this invention is to provide an improved means for providing automatic zero drift correction for instrument drift. Another object of this invention is to provide an improved zero drift correction which is unaffected by ambient temperature changes or electromagnetic pickup.

In accordance with this invention, there is provided apparatus which senses recorder pen position by means of a retransmitting slide wire in a recorder, develops a signal which is a function of pen position and compares the pen position signal with a preset zero position signal. A correction signal of appropriate polarity is developed and then added to the input signal from the measuring instrument which resets the recorder pen at zero just before data is to be recorded. Means are provided to apply the needed previously determined and applied zero correction signal to the recorder input while data is recorded.

The invention, as well as additional objects and advantages thereof, will best be understood when the following detailed description is read in connection with the accompanying drawing which shows, in schematic and block diagrammatical form, apparatus in accordance with this invention.

Referring to the drawing, there is shown a retransmitting slide wire, indicated generally by the numeral 10, from a recorder 68.

The resistance wire 12 has one end grounded and the other end coupled to the plus 15-volt output of a power supply 38 through a voltage dividing resistor 18.

The movable contact 14 of the slide wire 10 is coupled, through filter resistance 16 and capacitor 28 and switches 26 or 30, to the negative input of an FET input operational amplifier 32.

A hold capacitor 34 is coupled across the amplifier 32 between its output and the input to which the pen position signal from the slide wire 12 (via contact 14) is applied.

A trim adjust variable resistor 36 is coupled to the amplifier 32 as is output from the power supply 38.

The plus 15-volt output of the power supply 38 is coupled between voltage dividing resistor 22, zero adjustment potentiometer 20 and ground.

The movable contact 24 of the potentiometer 20 is coupled directly to the positive input of the amplifier 32.

The output of the amplifier 32 is coupled, through current limiting resistor 40, microammeter 42 (shunted by resistor 44), to one input of the recorder and across resistor 46 to ground. The automatic direct switch 48 is for the purpose of removing the automatic zeroing circuit from the detector circuit for any reason, e.g. trouble shooting.

The opposite end of the resistor 46 to which the output of the amplifier 32 is applied is coupled to the center tap 54 of potentiometer 52 which is a part of the bridge circuit in a signal generating device, e.g. a thermal conductivity detector 50, comprising reference (R) and measuring (M) filaments 56, 58, 60, 62 and a source of current, e.g. a battery 64, applying potential between opposed sides of the bridge. The output of the bridge opposite the potentiometer 52 is coupled to the other input of the recorder 68.

In operation, the position of the recorder pen determines the tap position on the retransmitting slide wire 10. A constant voltage is applied across the resistance wire 12 so that the tap 14 selects a voltage proportional to the position of the recorder pen. This pen position potential is applied to the negative input of the amplifier 32 by closing the switch 26 or 30, with switch 48 open. If the voltage selected by the retransmitting slide wire 10 (which is applied to the negative input of differential amplifier 32) is different from the fixed voltage selected on the zero adjust potentiometer 20 during the zeroing interval, the amplifier output voltage will change, causing the current through resistor 46 to change. This resistor 46 is in series with the signal and its voltage drop will either add to or subtract from the output of the detector 50. The circuit polarity is such that if the recorder pen is positioned too high, a negative correction will be inserted by resistor 46 and vice versa. The correction voltage will drive the recorder until its pen is positioned properly and will maintain this position until zeroing is terminated.

When it is desired to record a signal, the zero circuit is placed in the hold mode by opening switches 26 or 30, whichever had been closed. The amplifier output voltage is maintained at the same value obtained during the zero operation by the charge on the capacitor 34 while the output of the retransmitting slide wire is isolated from the amplifier by the open zero switch 26 and cam switch 30. The same voltage drop established during the zeroing operation is maintained across the resistor 46 allowing changes in signal to be applied to the recorder.

When it is desired to make a new zero determination, the automatic direct switch 48 should be open and either switch 26 or the cam operated switch 30 should be closed. The zero correction signal is applied across the resistor 46.

What is claimed is:

1. Electromechanical recorder zeroing apparatus for correcting recorder pen position to compensate for instrument drift, comprising a recorder having inputs, a pen whose position is coupled to a movable contact on a slide wire resistance element, said slide wire resistance element having a constant potential applied across it, a source of reference zeroing potential, a differential amplifier having a pair of inputs and an output, said reference zeroing potential being coupled to one input of said differential amplifier, switching means for coupling said movable contact to the other input of said differential amplifier at predetermined intervals, a storage capacitor, said storage capacitor being coupled between the output and the input of said differential amplifier to which said movable contact is coupled at predetermined intervals, a signal generating element having output terminals one of which is at ground potential, a zero correction signal resistance element connected between the output of the differential amplifier and ground potential, said signal generating element and said zero correction signal resistance element being connected in series across the inputs of said recorder.

2. Apparatus in accordance with claim 1, wherein said slide wire resistance element is an integral part of said recorder.

3. Apparatus in accordance with claim 1, wherein said signal generating element is a bridge type thermal conductivity detector.

4. Apparatus in accordance with claim 1, wherein a power source is coupled to said differential amplifier, to said slide wire resistance element and said source of zeroing potential.

5. Apparatus in accordance with claim 1, wherein said source of zeroing potential is a voltage developed across a resistor in series with a signal generating element.